United States Patent [19]

Holliday

[11] Patent Number: 5,127,629
[45] Date of Patent: Jul. 7, 1992

[54] VALVE STEM FLEX LIP BACKSEAT
[75] Inventor: David G. Holliday, Houston, Tex.
[73] Assignee: FMC Corporation, Chicago, Ill.
[21] Appl. No.: 705,469
[22] Filed: May 24, 1991
[51] Int. Cl.⁵ .............................. F16K 41/14
[52] U.S. Cl. .................... 251/330; 251/327
[58] Field of Search ................... 251/330, 327
[56] References Cited

U.S. PATENT DOCUMENTS

| 2,780,233 | 2/1957 | Volpin | 251/330 X |
| 3,152,786 | 10/1964 | Soderberg et al. | 251/330 X |
| 3,412,750 | 11/1968 | Volpin | 251/330 X |

FOREIGN PATENT DOCUMENTS 79575 11/1955 Netherlands ................. 251/330

Primary Examiner—Arnold Rosenthal
Attorney, Agent, or Firm—W. William Ritt, Jr.; Richard B. Megley

[57] ABSTRACT

A metal-to-metal backseating system for fluid flow control valves, comprising a flexible annular backseat element extending radially from a valve stem or closure element to sealingly engage a valve bonnet surface, and an annular backup for the backseat element.

8 Claims, 2 Drawing Sheets

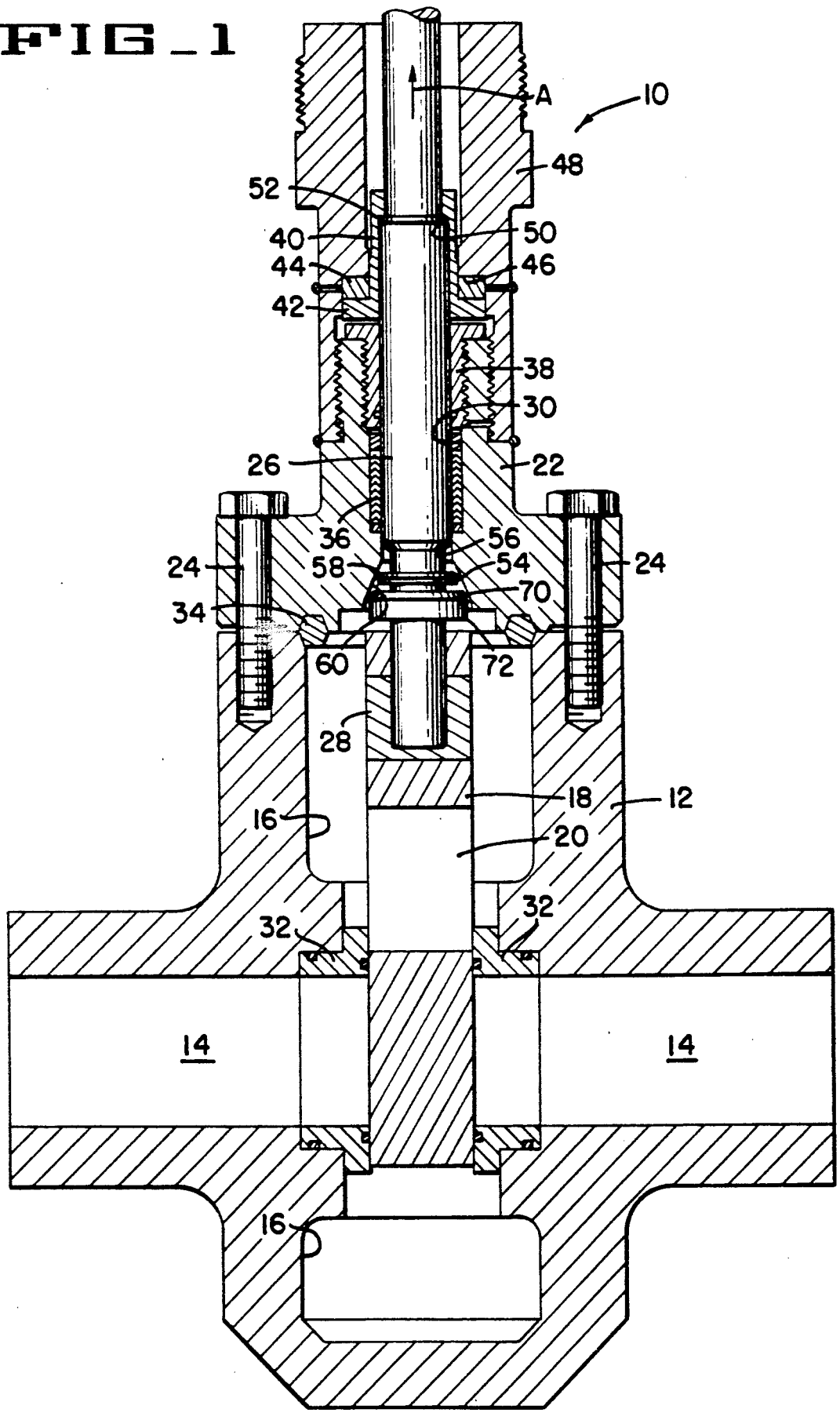
FIG_1

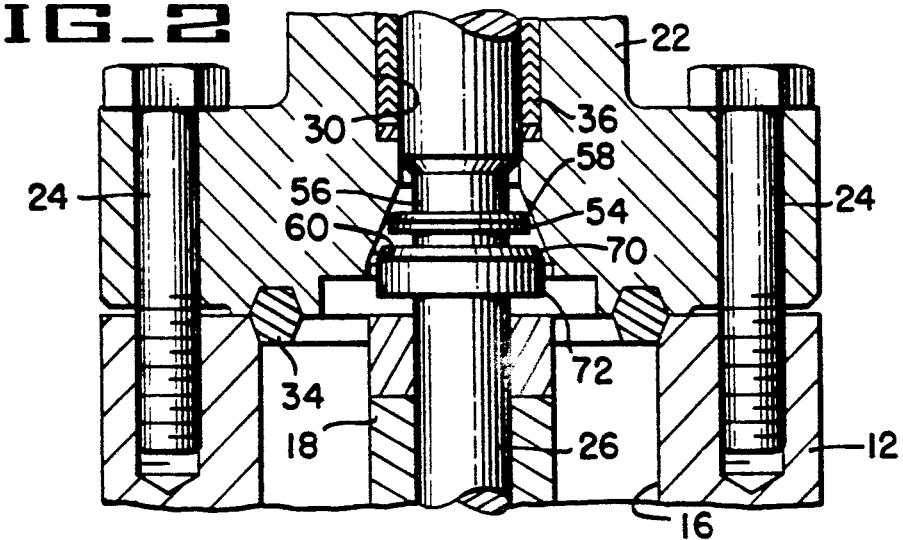
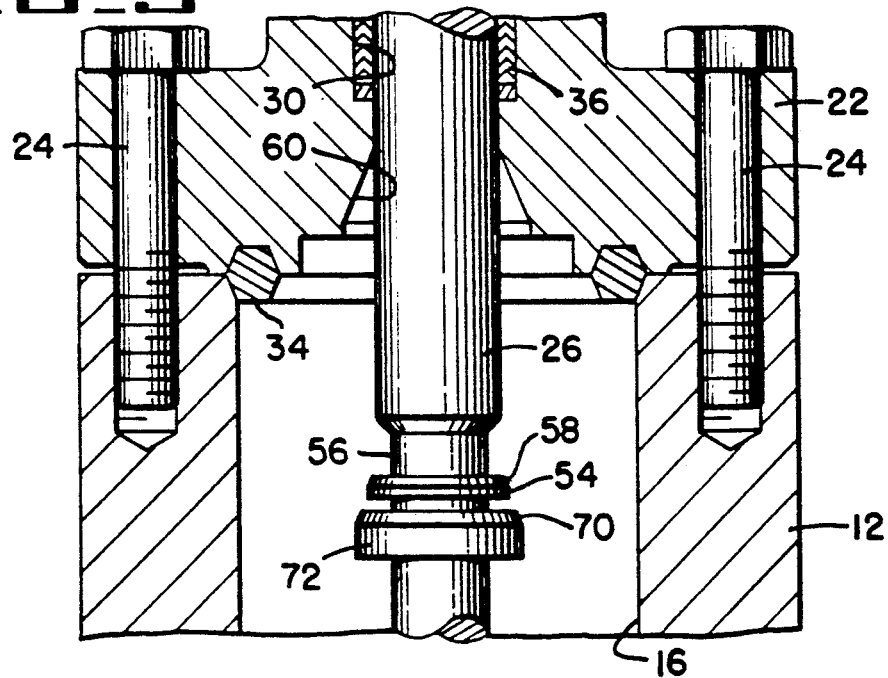
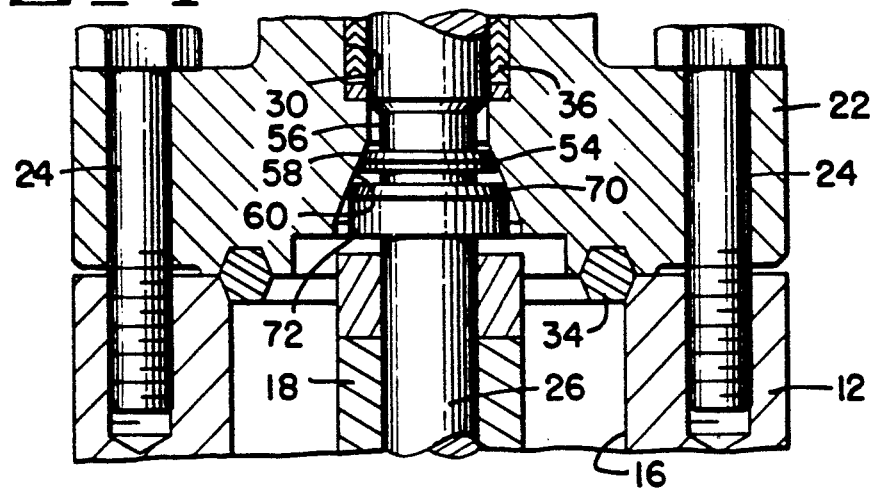

VALVE STEM FLEX LIP BACKSEAT

BACKGROUND OF THE INVENTION

This invention relates to backseats for stem valve assembles, and more particularly to such backseats that provide a metal-to-metal seal between the valve stem and bonnet.

Backseats are added to valve stems as a safety feature to provide a backup stem sealing mechanism for the packing that functions as the primary or main seal between the stem and the valve bonnet. If the packing fails, such as by developing a leak from wear, exposure to hostile fluids in the valve, exposure to extreme hot or cold temperatures, or any combination of these, the metal-to-metal seal created by the backseat is the only barrier left to prevent escape of fluid from the valve. Packings are especially vulnerable to destruction by fire, and in the absence of a backseat the escaping fluid could ignite and thus contribute to the fire's magnitude.

Conventional valve backseats employ either matched or non-matched angles of contact between the backseat and the bonnet. The conventional backseat is located on a relatively thick and non-flexible enlarged diameter portion of the valve stem, and therefore will not compensate for any mis-alignment between the stem and bonnet. The sealing ability of the conventional backseat design is very good when the high pressure inside the valve body acts on the end of the valve stem, resulting in sufficient axial load on the stem to prevent leakage. This design, however, will eventually begin to leak as the pressure in the valve body decreases and, therefore, the load on the valve stem also decreases. To overcome this drawback the stem is mechanically loaded to produce a seal at low pressures. Actuated valves, incorporating a spring return device, often will have a larger than standard spring to achieve this necessary force. The disadvantage of this approach is that the force required to create a seal with a conventional backseat design is quite high, often in excess of 2000 pounds. The spring required to produce such a force, and the larger sized actuator piston needed to overcome that spring force, causes the actuator to be significantly large and much more expensive.

SUMMARY OF THE INVENTION

The present invention overcomes the foregoing problems by providing a flexible metal backseat on the valve stem, the set being sufficiently flexible to conform to the valve bonnet sealing surface. The backseat of this invention comprises a relatively thin annular flange extending radially from the valve stem surface and having a frusto-conical sealing surface of relatively small axial length, all as compared with the conventional non-flexible backseats of many times the axial thickness. The flexible backseat of this invention enables the creation and maintenance of a low pressure stem-to-bonnet metal-to-metal seal without the need of external mechanisms to increase the axial load on the stem.

The flexing ability of the relatively thin backseat of this invention allows the sealing surface of the stem to be compliant with the bonnet sealing surface, thereby substantially reducing sensitivity of the backseat to misalignment between the stem and bonnet. The backseat of this invention provides a relatively wide frusto-conical sealing surface as compared with sharp angle backseats that rely on a line-of-contact sealing surface, thereby eliminating the chance that a pinhole, created by corrosion of one or both sealing surfaces, could result in seal leakage as is not un-common in such sharp angle designs. The sealing area is designed to not over-stress the surfaces between the stem and bonnet as is often the case with mis-matching angle designs.

No external loading is required to energize the seal provided by the present invention, even at low pressure in the valve body, a very beneficial feature that facilitates use of standard valve actuators with low return-force springs. This is in stark contrast with other backseat designs that require large loads, and thus special actuators with high-force return springs, to mechanically pull the stem back against the bonnet to maintain the metal-to-metal seal at low internal valve pressures.

BRIEF DESCRIPTION OF THE DRAWINGS

FIG. 1 is a central section through a gate valve with a flexible backseat on its stem according to the present invention, showing the valve gate in its closed position but the stem not backseated.

FIG. 2 is a fragmentary view, in central section and on an enlarged scale, of the valve backseat and adjacent area as seen in FIG. 1.

FIG. 3 is a view like FIG. 2, but showing the position of the backseat when the valve gate is in its open position.

FIG. 4 is a view like FIG. 2, showing the flexible backseat in its functional position against the bonnet sealing surface.

DESCRIPTION OF THE PREFERRED EMBODIMENT

As seen in FIG. 1, a rising stem gate valve 10 with a flexible backseat according to the present invention comprises a valve body 12 with a flow passage 14 intersecting a body chamber 16 in which a valve gate 18 is located for reciprocal movement between its closed position, as shown in FIG. 1, and its open position wherein a port 20 in the gate is aligned with the flow passage 14. The valve 10 further includes a bonnet 22 secured to the body 12 as by a plurality of circumferentially spaced cap screws 24 (two shown), and a rising stem 26 that is connected to the gate, such as by a lift nut 28, and that extends through a bore 30 in the bonnet 22 into engagement with a valve actuator (not shown).

A pair of annular seal assembles 32 provide a pressure seal between the valve body 12 and the gate 18 when the gate is its fully closed or open positions, and another annular seal 34 functions as such between the body 12 and the bonnet 22. An annular stem packing 36, secured in place by a packing nut 38 threaded to the bonnet 22, provides a dynamic pressure seal between the stem 26 and the bonnet.

A retaining sleeve 40 with a redial flange 42 surrounds the stem 26 above the packing nut 38, and a eutectic ring 44 is held in place around the sleeve 40 and against the flange 42 by a radial surface 46 of a bonnet adapter 48 that is threaded onto the bonnet 22. An inner annular shoulder 50 in the bore of the sleeve 40 cooperates with an outer annular shoulder 52 on the stem to provide a stop against further upward movement of the stem (per a row A) from its illustrated position, wherein the gate is closed, so long as the eutectic ring 44 is intact.

As best seen in FIGS. 2–4, the valve stem 26 includes an annular flex lip backseat 54 in the shape of an annular flange extending radially outward from the surface of a reduced diameter portion 56 of the stem located between the gate 18 and the stem packing 36. The flex lip backseat 54 has an upper frusto-conical surface 58 that cooperates with a complementary frusto-conical backseat sealing surface 60 in the bore of the bonnet 22 to provide a metal-to-metal seal between the stem and the bonnet when the eutectic ring 44 melts or otherwise disintegrates from a fire or other high temperature, and the stem 26 moves further upward until these frusto-conical surfaces are in contact (FIG. 4). The flex lip backseat 54 has a very thin axial dimension as compared to conventional backseat elements, and this thin dimension facilitates flexure of the backseat 54 to accommodate any mis-alignment thereof with respect to the bonnet sealing surface 60, thereby assuring a uniform seal is established between the backseat and bonnet. Since the backseat 54 flexes as it contacts the bonnet sealing surface 60, the primary seating procedure involves deflection rather than moving metal as is the case with conventional valve stem backseats. The flexibility of the backseat 54 also results in a multiplying effect on the seal's contact stress as the pressure thereon increase.

In the event a backup for the backseat 54 is desired, or perhaps required by customer specifications, the present invention facilitates including an emergency annular sealing shoulder 70 on a relatively thick and inflexible radial flange 72 located between the backseat 54 and the valve gate 18. The sealing shoulder 70 will not contact bonnet sealing surface 60 in normal operation, but if sufficient axial force is applied on the valve stem 26 the backseat 54 will flex enough to enable the shoulder 70 to contact the bonnet sealing surface 60 and establish a backup metal-to-metal seal therewith.

Although the foregoing preferred embodiment description is that of a rising stem gate valve, it should be understood that the present invention can be employed in valves with non-rising stems, in which case the backseat is located on the gate or other closure element itself, and in choke valves wherein the backseat is located to seal on a choke bean surface.

Although the best mode contemplated for carrying out the present invention has been herein shown and described, it will be apparent that modification and variation may be made without departing from what is regarded to be the subject matter of the invention.

What is claimed is:

1. A metal-to-metal backseating system for fluid flow control valves, said system comprising
   a) valve body with a flow passage and a body chamber in communication with said passage;
   b) a valve closure element in said chamber, said element mounted for movement between open and closed positions;
   c) a valve bonnet secured to the valve body, said bonnet having a bore in communication with said chamber, said bore having an annular sealing surface;
   d) a valve stem connected to said valve closure element and extending into said bonnet bore;
   e) a flexible backseat element for providing a metal-to-metal seal of said bonnet bore, said backseat element comprising an annular flange extending radially outward from one of said valve stem and said valve closure element at a location thereon to sealingly engage said bonnet bore sealing surface when said valve closure element is in a closed position blocking flow through said flow passage, said backseat element having sufficient flexibility to conform by flexure into a pressure-tight metal-to-metal continuous annular seal with said bonnet bore sealing surface; and
   f) a backup for said flexible backseat element, said backup comprising an annular sealing shoulder surrounding the valve stem at a location thereon to facilitate engaging and establishing a metal-to-metal seal with said bonnet bore when said flexible backseat element is flexed beyond its normal sealing condition.

2. A valve backseating system according to claim 1 wherein said bonnet bore sealing surface has a frusto-conical configuration.

3. A valve backseating system according to claim 2 wherein said backseat element has an annular frusto-conical sealing surface complementary to said bonnet bore sealing surface.

4. A valve backseating system according to claim 1 wherein said valve stem undergoes axial movement with respect to said valve bonnet as said valve closure element is moved between its open and closed position.

5. A valve backseating system according to claim 1 wherein said flexible backseat element is located on said valve stem between said valve bonnet and said valve closure element.

6. A valve backseating system according to claim 5 including means to move said valve stem axially to effect pressure-tight contact between said flexible backseat element and said bonnet bore sealing surface.

7. A valve backseating system according to claim 1 wherein said annular sealing shoulder resides on a rigid non-flexible radial flange located between said flexible backseat element and said valve closure element.

8. A valve backseating system according to claim 1 including means to move said valve closure element between open and closed positions.

* * * * *